United States Patent
Mandanapu et al.

(10) Patent No.: US 10,609,224 B2
(45) Date of Patent: Mar. 31, 2020

(54) METHOD AND SYSTEM FOR DYNAMICALLY ALLOCATING OPERATOR SPECIFIC BILLING RULES FOR DATA EXCHANGE BY AN APPLICATION ON A USER EQUIPMENT

(71) Applicant: Orange, Paris (FR)

(72) Inventors: Subash Mandanapu, Fremont, CA (US); Manoj Mourya, Fremont, CA (US)

(73) Assignee: ORANGE, Paris (FR)

( * ) Notice: Subject to any disclaimer, the term of this patent is extended or adjusted under 35 U.S.C. 154(b) by 70 days.

(21) Appl. No.: 15/539,942

(22) PCT Filed: Dec. 21, 2015

(86) PCT No.: PCT/IB2015/002628
§ 371 (c)(1),
(2) Date: Jun. 26, 2017

(87) PCT Pub. No.: WO2016/103053
PCT Pub. Date: Jun. 30, 2016

(65) Prior Publication Data
US 2018/0007213 A1 Jan. 4, 2018

Related U.S. Application Data

(60) Provisional application No. 62/096,688, filed on Dec. 24, 2014.

(51) Int. Cl.
*H04M 15/00* (2006.01)
*H04L 12/14* (2006.01)
(Continued)

(52) U.S. Cl.
CPC ........ *H04M 15/66* (2013.01); *H04L 12/1407* (2013.01); *H04L 12/1435* (2013.01);
(Continued)

(58) Field of Classification Search
CPC ............. H04L 12/1407; H04L 12/1435; H04L 41/0893; H04L 41/0896; H04M 15/60;
(Continued)

(56) References Cited

U.S. PATENT DOCUMENTS 10,009,187 B2 * 6/2018 Won .................. H04W 28/0268
2013/0017803 A1 * 1/2013 Li ....................... H04L 12/1403
455/406

(Continued)

FOREIGN PATENT DOCUMENTS

WO 2014207550 A2 12/2014

OTHER PUBLICATIONS

International Search Report and Written Opinion dated May 17, 2016 for corresponding International Application No. PCT/IB2015/002628, filed Dec. 21, 2015.
(Continued)

*Primary Examiner* — Robert J Lopata
(74) *Attorney, Agent, or Firm* — David D. Brush; Westman, Champlin & Koehler, P.A.

(57) ABSTRACT

The present system relates to a server for providing data connectivity in a packet mode communication network. The server has a processor arranged to receive, via a first brokerage control unit, a charging rule request to allow one or more communication devices in the communication network to exchange with an application server data charged under operator specific billing. The server determines availability of the operator specific billing based on network parameters and the charging rule request, and updates the database of a Policy and Charging Rules Function (PCRF) entity in the communication network based on available operator specific billing and an identifier for the application server, for subsequent charging of data exchanged with the application server at said available operator specific billing.

14 Claims, 6 Drawing Sheets

(51) Int. Cl.
*H04M 17/02* (2006.01)
*H04L 12/24* (2006.01)
(52) U.S. Cl.
CPC .......... *H04M 15/09* (2013.01); *H04M 15/60* (2013.01); *H04M 15/80* (2013.01); *H04M 15/805* (2013.01); *H04M 15/8214* (2013.01); *H04M 17/02* (2013.01); *H04L 41/0893* (2013.01); *H04L 41/0896* (2013.01); *H04M 2215/782* (2013.01)
(58) Field of Classification Search
CPC .......... H04M 15/66; H04M 2215/782; H04M 15/09; H04M 15/80; H04M 15/805; H04M 15/8214; H04M 17/02; G06F 9/4443
USPC .......................................... 370/328
See application file for complete search history.

(56) References Cited

U.S. PATENT DOCUMENTS

| | | | | |
|---|---|---|---|---|
| 2013/0151710 | A1* | 6/2013 | D'souza | H04L 41/08 709/226 |
| 2014/0094138 | A1* | 4/2014 | Saker | H04L 12/1407 455/406 |
| 2014/0153391 | A1* | 6/2014 | Ludwig | H04L 41/0816 370/230 |
| 2015/0044989 | A1* | 2/2015 | De Foy | H04L 12/1478 455/406 |
| 2015/0103780 | A1* | 4/2015 | Kaippallimalil | H04W 60/00 370/329 |
| 2016/0127951 | A1* | 5/2016 | Skarp | H04W 28/26 370/329 |
| 2017/0006451 | A1 | 1/2017 | Mandanapu | |
| 2017/0187888 | A1* | 6/2017 | Shukla | H04M 15/8214 |
| 2017/0214536 | A1* | 7/2017 | Wang | H04W 4/24 |
| 2017/0257490 | A1* | 9/2017 | Wang | H04W 24/00 |
| 2017/0331691 | A1* | 11/2017 | Zhou | H04L 69/08 |
| 2018/0248708 | A1* | 8/2018 | Won | H04W 28/0268 |

OTHER PUBLICATIONS

"3rd Generation Partnership Project; Technical Specification Group Services and System Aspects; Study on Policy Solutions and Enhancements (Release 11), 3GPP TR 23.813 V11.0.0", Jun. 12, 2011, pp. 1-41 XP055023830.

* cited by examiner

METHOD AND SYSTEM FOR DYNAMICALLY ALLOCATING OPERATOR SPECIFIC BILLING RULES FOR DATA EXCHANGE BY AN APPLICATION ON A USER EQUIPMENT

CROSS-REFERENCE TO RELATED APPLICATIONS

This Application is a Section 371 National Stage Application of International Application No. PCT/IB2015/002628, filed Dec. 21, 2015, which is incorporated by reference in its entirety and published as WO 2016/103053 A1 on Jun. 30, 2016, in English.

BACKGROUND

Field

The present application relates generally to acquiring access to a data network and more specifically to systems, methods, and devices for toll-free application data network access.

Description of Related Technology

In many telecommunication networks, the operator of the network controls which electronic devices can access the network as well as the degree of access permitted. The access may be controlled by a subscription. The subscription is generally an agreement between a user of the electronic device and a network operator. The agreement typically includes payment for access and may be referred to as a billing scheme.

As devices become more robust, the content available for display via the devices also increases. The devices may process more data in a faster way to provide enhanced user experiences. For example, electronic devices such as smartphones are capable of downloading high-definition video content via a cellular/LTE/3G connection for display on the smartphone. When the billing scheme of a user includes data access, it is referred to as a data plan.

While the devices may be consuming more data, the users must account for the increased data obtained via the network. To help curb the overall network impact, some network operators have introduced limited data plans, through e.g. an allowed quantity per month. These limited plans allow a fixed quantity of data access for a device. Should a particular device consume more than the plan amount, the user of such a device is either cutoff from further access or permitted additional access at an extra, perhaps, cost.

Furthermore, some devices are available without a data plan. Such devices may be configured to execute applications such as a video or music player. These devices may attach to a data network using a Wi-Fi access point, but, due to the lack of a contract, are unable to access the data network via cellular/LTE/3G connections.

To avoid the burden of limited data plans to the users, some network operators and telcos have partnered with third party companies to offer toll-free (e.g., no charge) or discounted connectivity for applications. For example, the third party companies may offer prepaid applications that would allow a user to access and use an application for a certain amount of time or data, even in a roaming situation. The data connectivity of such an application is then charged to the third party company providing the application. This charging reversed to the third party company may be referred to as operator specific billing.

Different solutions exist today to offer discounted connectivity for application. The data packets exchanged by the application may be tagged with an indication of operator specific billing by an agent local to the electronic device. Alternatively, the packets may be monitored, i.e. filtered on the network side for identifying the application and applying the network specific billing, once a wrapper layer for the application has requested the discounted data connectivity.

A problem nevertheless arises when adapting the existing billing schemes to add network specific one. Today offering discounted connectivity is still based on a one on one agreement between a third party and a network operator. Accordingly, devices, systems, and methods for facilitating operator specific billing schemes are desirable.

SUMMARY OF CERTAIN INNOVATIVE ASPECTS

In one innovative aspect, there is a method for providing data connectivity in a packet mode communication network, the method comprising receiving, via a first brokerage control unit, a charging rule request to allow one or more communication devices in the communication network to exchange with an application server data charged under operator specific billing; determining availability of the operator specific billing based on network parameters and the charging rule request, and updating the database of a Policy and Charging Rules Function (PCRF) entity in the communication network based on available operator specific billing and an identifier for the application server, for subsequent charging of data exchanged with the application server at said available operator specific billing.

Thanks to the present system and method, application providers offering content from an application server to communication devices may negotiate and offer prepaid applications to all their customers. With a prepaid application compatible to access the content, and thanks to the negotiated operator specific billing, the user may be able to access such content at no charge to his regular data plan. There is no longer the need for one on one negotiation for each prepaid application. Discounted or wholesales connectivity may be offered on the fly, and vary in time as new deals are built through APIs of a wholesale server or platform put in place by the operator of the communication network.

In another innovative aspect, there is server for providing data connectivity in a packet mode communication network, the comprising a processor arranged to receive, via a first brokerage control unit, a charging rule request to allow one or more communication devices in the communication network to exchange with an application server data charged under operator specific billing; determine availability of the operator specific billing based on network parameters and the charging rule request, and update the database of a Policy and Charging Rules Function (PCRF) entity in the communication network based on available operator specific billing and an identifier for the application server, for subsequent charging of data exchanged with the application server at said available operator specific billing.

In a further innovative aspect, there is a non-transitory computer-readable storage medium comprising a program product stored thereon with instructions executable by a processor of an apparatus in the form of a software agent including at least one software module set up to implement a method of providing data connectivity in a packet mode communication network. The instructions cause the processor to receive, via a first brokerage control unit, a charging rule request to allow one or more communication devices in the communication network to exchange with an application server data charged under operator specific billing; to determine availability of the operator specific billing based on network parameters and the charging rule request, and instructions to update the database of a Policy and Charging Rules Function (PCRF) entity in the communication network based on available operator specific billing and an identifier for the application server, for subsequent charging of data exchanged with the application server at said available operator specific billing.

The present systems, methods, and devices each have several aspects, no single one of which is solely responsible for its desirable attributes. Without limiting the scope of the present system as expressed by the claims which follow, some features will now be discussed briefly. After considering this discussion, and particularly after reading the section entitled "Detailed Description" one will understand how the features of this present system provide advantages that include secure toll-free cross carrier data network access.

DETAILED DESCRIPTION OF CERTAIN ILLUSTRATIVE EMBODIMENTS

Figure 1:
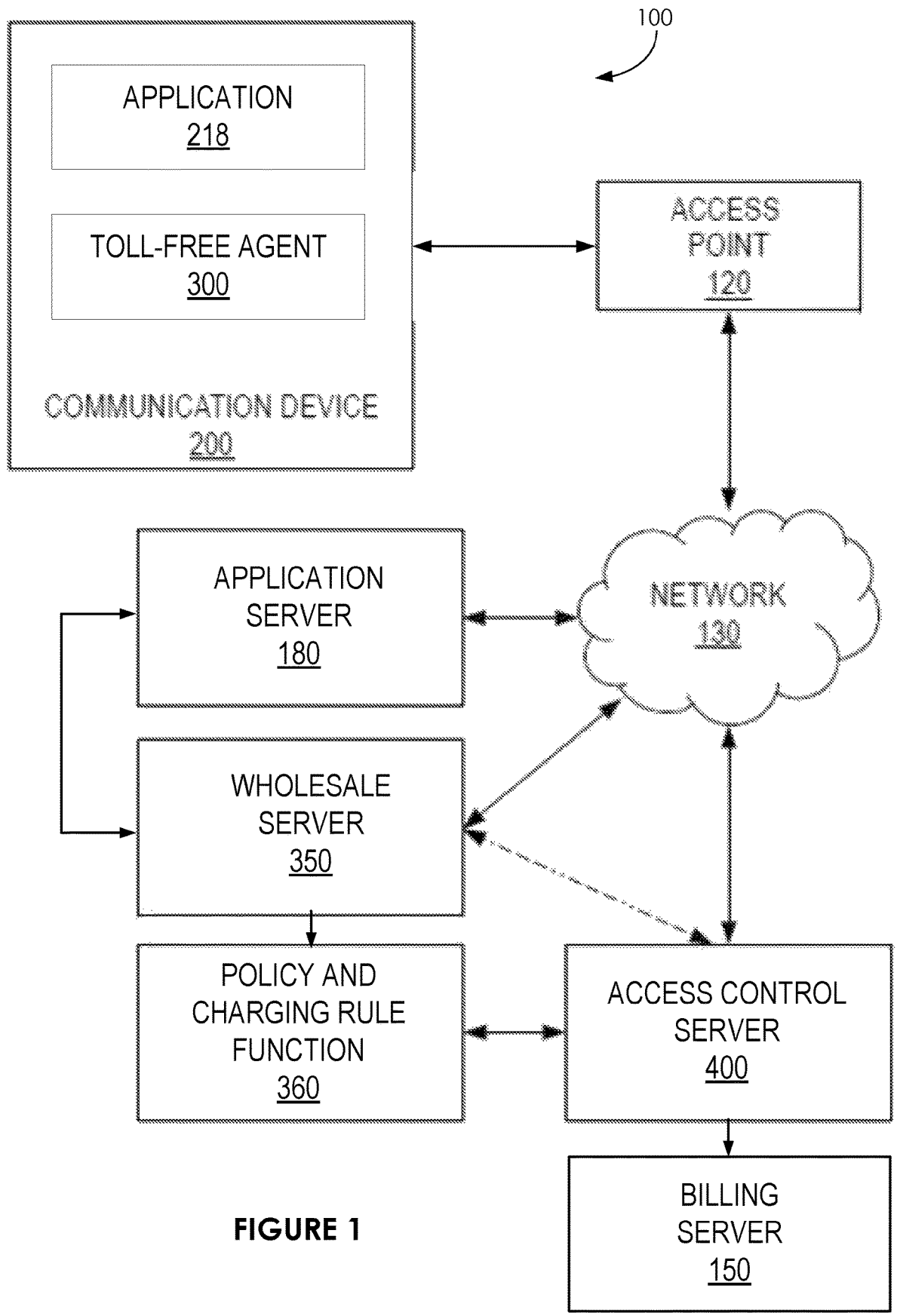
FIG. 1 is a functional block diagram of an example communication network system.

In one aspect, an architecture comprising a first application operable to request data connection to a telecommunication network in a client/server mode is provided. The architecture may include a wrapper for the first application and operable to detect triggering of the first application (or intercept first request for data from server), send an authorization request to a billing server in the telecommunication network, the authorization comprising an application identifier and an operator identifier for requesting special handling of the first application data connection from the operator, and, upon receipt of an authorization from the billing server, authorizing data connection to the network from the first application.

In another aspect, an operator server for monitoring data activity from a subscriber communication device is provided. The operator server is operable to store data connectivity policy information for a communication device. The data connectivity policy information may include a data traffic threshold the communication device may exchange with one or more service providers over a telecommunication network. The data traffic threshold corresponds to the data plan of the subscriber and marks a change in data traffic billing for the electronic device. The operator server is further operable to monitor, via data connections to a telecommunication network, data traffic from instances of one or more applications installed on the electronic device. A first quantity indicative of the data traffic monitored via the data connections may be maintained by the server to trigger operator specific billing when e.g. the monthly traffic threshold has been reached. Alternatively, the application may be prepaid for any use, not necessarily beyond the limited data plan if nay.

Some network operators may find a benefit in partnering with third party companies to offer toll-free (e.g., no charge) or discounted connectivity for applications. By toll-free application, also referred as prepaid application here after, one may understand that the connectivity needed by such an application is paid by a third party company, i.e. operator specific billing is applied instead of the regular data plan of the user. For example, the companies may offer prepaid applications that would allow a user to access and use an application for a certain amount of time or data, even in a roaming situation. Such an application could allow for instance access to a content source controlled by a third party company, the actual billing of the access being handled between the network operator and the third party company, transparently to the user. By operator specific billing for an application, one may understand a billing or charging of the data exchanged with a content or application server at conditions different than regular data traffic exchanged within the subscriber data plan. The operator specific billing may correspond for instance to application specific billing when the billing becomes broken down to some specific applications. The actual billing may be handled by a Policy and Charging Rules Function (PCRF) entity updated with available operator specific billing in response to a charging rule request sent by the third party through an API (application programming interface) platform such as a brokerage control unit.

The systems and methods described herein provide the management of the toll-free connectivity without the need for user interaction. This is achieved in-part via an intermediary or wholesale platform that may grant, based on network parameters, operator specific billing in answer to a charging rule request received by a third party application or content server. The intermediary platform will update an entry in a database of a PCRF entity to implement operator or application specific billing when an electronic device interacts through a dedicated application with the third party application server.

The toll-free connectivity may achieve in another part, on the electronic device side, via by an application wrapper that is associated with a regular application. The wrapper is generally arranged to detect triggering of the application. Once triggered, the wrapper may send a request to the network to identify application charging rules, i.e. a (data traffic) billing plan specific to the application. The specific data plan will be retrieved from the PCRF database. The wrapper may receive authorization from the network and execute the application normally under the billing plan specific to the application, i.e. exchange data packets with an application server the application operates with. The wrapper may report monitored data usage for the application to the network. Through the use of wrapper, the billing of the application may not be charged to the user or charged at a discounted rate, according to the specific data plan.

In the present system, a subscriber or user to a network has access to content/service providers through data connections enabled thanks to a data connectivity policy, also referred to as the subscription or data plan of the user. The data plan may defined a data connectivity policy which may be for instance a data traffic (quantity) threshold like 4 Gb per month. The data plan may define other conditions such as data traffic thresholds per application, like x Gb of streaming (application) from a content provider A, y GB of data traffic for a game application PlayGames . . . . Such gaming or streaming application may be data consuming.

As one example, consider a content provider or third party company like "MegaSports." MegaSports may develop and provide an application which may execute on electronic devices such as mobile devices but requires access to a data or telecommunication network to obtain the content. A user A may use profusely the MegaSports application to stream sports games on his communication device. Every month, the user A exceeds his data plan due to his intensive usage of the MegaSports application. Any data connection activities (i.e. data traffic) by the device beyond the data traffic threshold of 4 Gb per month may be charged to the user at a high cost. He then may be tempted to walk away from the MegaSports application.

To help with its customers, MegaSports will need to negotiate a global wholesale data access deal with a network provider like SuperTelco, which for the sake of simplicity is the network operator the user A is a subscriber of. SuperTelco is also referred to as the home network to the user A and his electronic device. The deal will specify various data access limits for traffic associated with the application. Examples of these limits may include one or more of a maximum data limit, per data unit (e.g., byte, megabyte, gigabyte) price, and geographic coverage, service level agreements (SLAs) on mobile, fixed, per user limits, etc. SuperTelco may provide an API/wrapper to MegaSports' application.

Thanks to the present intermediary platform, the MegaSports application server may negotiate the wholesale data access through a charging rule request sent to the intermediary platform. The charging rule request is a request to allow the electronic device of user A to access the MegaSports application server under MegaSports application specific billing, or MegaSports specific billing in short. The charging rule request may define an amount of data available to the communication devices per month, or a duration of connection per period of time. The charging rule request may comprise an indication that operator specific billing is requested from Telco so that MegaSports may handle the charging of data exchanged between communication device and its content server. The charging rule request may also comprise an identifier and an address for the MegaSports content server. A negotiation process implying back and forth communications between the intermediary platform and the MegaSports application server may be necessary to determine available operator specific billing plans and obtain validation from the MegaSports server.

Once granted based on network parameters, as detailed here after, the intermediary platform will update the database of a PCRF entity in the network with the selected available operator specific billing in response to the charging rule request.

One non-limiting advantage of the described aspects is the ability to provide a data rich application in way that does not require the user to pay for accessing. The bargain of receiving the user's usage data in exchange for free data access subsidized by the application provider may be an attractive bargain.

A further non-limiting advantage of the described aspects is the transparency to the user and the ease of implementation for the third party providing the application. In part because the application wrapper in its prepaid version forms a contain within which the application can execute, the functions of the application may be monitored and enhanced to provide the toll-free experience without the need for further user or application provider configurations.

Another non-limiting advantage of the described aspects is the application can access a network controlled by a wholesale network operator who has negotiated the operator specific billing with the application provider. The application may also access a network controlled by a partner network operator (e.g., roaming). In such implementations, the partner may allow the application toll-free access and instead of charging the user, the partner can reconcile the cost of the access with the wholesale operator. Furthermore, devices without a traditional cellular data plan may use aspects described to use a data rich application.

An electronic device subscriber to an operator network may be associated to a data connectivity policy defining conditions under which the device may exchange data traffic with one or more service provider over the network. Within these conditions, data traffic may be billed to the user of the electronic device at a fixed or advantageous cost. Outside these conditions, data may still be exchanged but under different billing schemes, generally much higher. The conditions may comprise one or more data traffic thresholds marking each a change in data traffic billings. The data traffic thresholds may define a quantity or a duration of data traffic. Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the present system. For example, an apparatus may be implemented or a method may be practiced using any number of the aspects set forth herein. In addition, the scope of the present system is intended to cover such an apparatus or method which is practiced using other structure, functionality, or structure and functionality in addition to or other than the various aspects of the system set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different data access technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a functional block diagram of an example communication network system. The system 100 includes a communication device 200. The communication device 200 may be an electronic device or user equipment such as a mobile phone, a smart phone, a tablet computer, a personal computer, a game console, a set-top box, or other communication device configured to transmit/receive data.

The communication device 200 may include an application 218. An application may generally refer to an installed capability for the communication device 200. More generally, the expressions application or application program (AP) in the present description may be taken in a very general sense, and may be seen as any tool that functions and is operated by means of a computer, with the purpose of performing one or more functions or tasks for a user or another application program. To interact with and control an AP, a graphical user interface (GUI) of the AP may be displayed on the display of the electronic device. Example applications include a web browser, a movie viewer, a music player, a newsreader, a document editor, or other functional additions to the communication device 200. The application 218 may be installed on the communication device 200 by the manufacturer, a network operator providing service for the device, and/or a user of the communication device 200. The application 218 may be installed once hardware is attached to the communication device 200. For example, attaching a sensor to the communication device 200 may cause the execution/installation of the application 218. The installation may be performed at the time of manufacture, via over the air provisioning, via storage coupled to the communication device 200 such as a SIM card, or other suitable installation means.

The application 218 may be wrapped by a wrapper or toll free agent 300. The wrapper may be considered a container for the application 218. The application 218 may be executable without a wrapper (as it is a regular application to begin with), but the wrapper may provide additional functionality for the application 218 without requiring the application developer to know the details of the wrapper interface. For example, an application developer may generate a new interactive game. Standing alone, the application 218 may request network access for playing the game. In a wrapped mode, the application may request network access via the wrapper for playing the game. The wrapper may intercept the network access request and perform additional processing related thereto such as associating the application to operator specific billing, i.e. data traffic billing specific to that application used subsequently by the network operator when charging the data exchanged with an application server.

The application 218 is indeed assumed in the present system to exchange data with an application server 180. The charging of the exchanged data may be either according to the data connectivity policy, i.e. the regular data plan of the communication device 200. Under certain conditions, as explained here after, the charging may be according to charging rules for prepaid or sponsored data, i.e. operator specific billing, or even more specifically application specific billing.

The communication device 200 may be configured to access a network 130 via an access point 120. The access point 120 may be a Wi-Fi access point, a cellular access point, an LTE or other 3G access point, a radio access point, a wired access point (e.g., Ethernet), or other network portal. Accordingly, the network 130 may be a packet switched network, a public network, a wide-area network, a private area network, a mesh network, a cellular network, a radio network, a local area network, or other such communication network configured to transmit and receive data between devices.

The access point 120 may be configured to permit certain communication devices access to the network 130. The access point 120 may perform authorization for the communication device before allowing access to the network 130. The communication device 200 may provide information to the access point 120 which may be used to determine whether or not to allow the communication device 200 to access the network 130. The access point 120 is generally associated with an entity such as a network operator. The network operator is the entity which determines which electronic devices may access the network 130. For example, a telecommunications company may construct a radio tower access point to allow customers with a valid subscription to access a network. In such cases, the telecommunications company may wish to limit or otherwise control who can access the network.

FIG. 1 shows an access control server 400 in data communication with the network 130. The access control server 400 is configured to provide access to electronic or communication devices on a subscription basis. The access control server 400 may receive information regarding communication devices and/or applications which are allocated an amount of network access, based on a data connectivity policy for each communication device. Accordingly, when a communication device requests access via the access point 120, the access point 120 may inquire with the access control server 400 as to whether the communication device is authorized for network access. For example, a determination as to whether the communication device 200 has a valid subscription may be performed. In the event the communication device is not authorized, the access point 120 may decline the network access to the communication device 200. The network operator managing the access control server 400 will be referred to as the home network operator to the communication device 200.

The access control server 400 is in further communication with a billing server 150. The billing server 150 is configured to receive information regarding access for the access control server 400. Where the access point 120 is operated by an entity other than the home network operator, the operator of the network access point 120 may request compensation for allowing the communication device 200 to access the network. The billing server 150 may be configured to facilitate this reimbursement by reconciling the usage authorized by the access control server 400 with the operator of the network access point 120. In some implementations, the billing server 150 may be configured to generate a billing request to a third-party such as the application developer or server 180. The billing request may indicate an amount requested. In some implementations, the billing server 150 may be configured to generate a billing request to an account associated with the communication device 200. More generally, the billing server 150 will apply the operator specific billing selected in response to the charging rule request and associated in the PCRF database 360 with an identifier for the application server 180.

The access control server 400 may also in further communication with a wholesale or intermediary platform 350, to enable prepaid (e.g. wrapped) applications to get access to the network 130 on a wholesale basis. The wholesale platform 350, hosted by a wholesale server, may be accessible through APIs (application programming interface) such as a brokerage unit (not shown in FIG. 1) to publicize availability of the network for wholesale access to third party servers like MegaSports server 180. For the sake of simplicity, it is assumed that the server that sends the charging rule request for a third party like MegaSports is the same server as the content or application server delivering content to a corresponding application on a user equipment 200. Alternatively, one may distinguish an application provider, e.g. the MegaSports application provider, providing the application that operates with the application server, such as the MegaSports application and the MegaSports server respectively.

As explained before, the charging rule request defines charging rules to allow one or more communication devices in the communication network to exchange with the application server 180 data charged under operator specific billing. One the charging rule request is received from the application server 180, the wholesale server 350 will determine availability of the operator specific billing based on network parameters and the charging rule request. The available operator specific billing, that may be validated by the application server 180, will be sent to the PCRF entity 360 for association with an identifier of the application server.

The access control operator server 400 is further configured to communicate with a packet inspector. Not shown in FIG. 1, the packet inspector may be in direct communication with the access control server 400. In some implementations, the packet inspector 160 may be coupled via the network to the access control server 400. In some implementations, the packet inspector may be integrated as part of the access control server 400.

The packet inspector 160, using e.g. computer network packet filtering, is configured to receive a packet of data and identify characteristics of the packet through a deep packet inspection (DPI) at OSI level 7 and above. Alternatively, this may involve inspection of a stream of data packets at OSI levels 3 or 4, also called SPI for "Shallow Packet Inspection". In this case this entails an IP and TCP ("Transmission Control Protocol"), or UDP ("User Datagram Protocol"), data packets inspection. Such packets of data may include the data traffic from data connections over the network 130 to and from the communication device 200. Characteristics which the packet inspector can identify include source address, destination address, source URL, destination URL, packet size, packet length, packet transmission time, application generating the packet, and the like. The packet inspector may be configured to transmit an inspection report including one or more of the characteristics identified. In some implementations, the packet inspector may provide several services. For example, a service designed to accept the packet and return the application identifier for the application generating the packet may be included. As another example, a service designed to accept the packet and one or more inspection rules and return a Boolean value indicating whether the packet is permitted may be included.

The communication device 200 may be configured to exchange data via a 3G, 4G, LTE or GPRS network with remote servers such as the access control server 400 and/or the application server 180, and to enable data exchange enabling Internet access (e.g., data network). The communication device 200 is operable to have applications or widgets 218 installed, such as, but not limited to social networking applications, gaming, streaming applications or email applications, for example, which when executed may exchange data with one or more service providers, e.g. remote servers. Each application or widget installed on the communication device 200 may have an associated graphical user interface.

The communication device 200 may further include a wrapped version of the application 218 or alternatively a toll free agent 300, both to enable the implementation of operator specific billing in association with the access control server 400 and the PCR entity 360. A wrapped application 220 is distinguishable from an application in that communications to/from the wrapped application 220 are exchanged via an application wrapper, to enable network specific billing for its data activity, e.g. prepaid or discounted. Implementation of such an application is disclosed in PCT application 162014/001442. The toll free agent 300 itself is an agent using a local configuration file to tag data connectivity request from the application 218 with an operator specific billing tag when applicable. Implementation of the toll free agent is disclosed in U.S. application U.S. 61/920,178.

Figure 3:
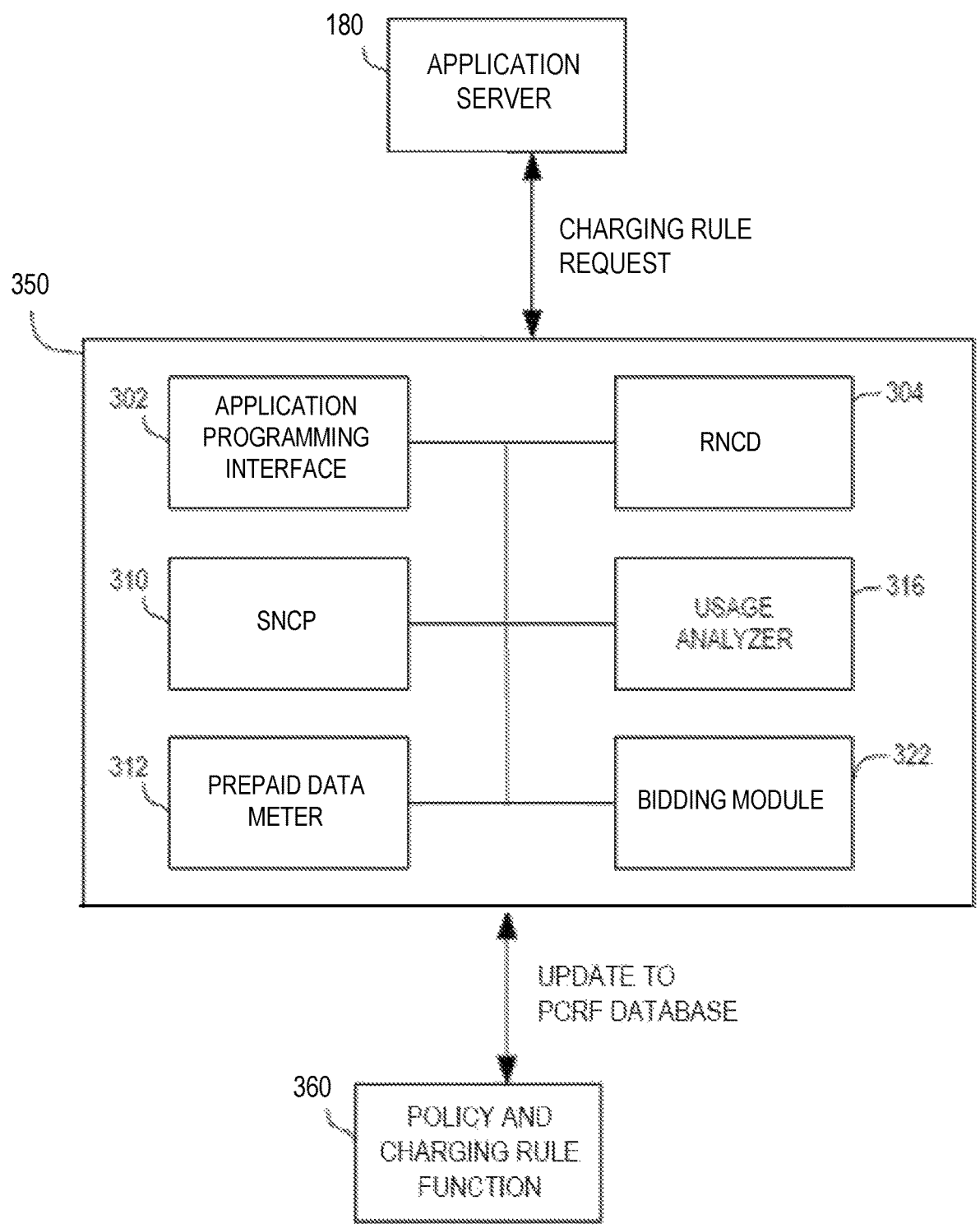
FIG. 3 is a functional block diagram of an example wholesale server.

FIG. 3 is a functional block diagram of an example of wrapper wholesale or intermediary server 350. The wholesale server 350 interacts with an application server 180 to enable the present method through a plurality of modules or units as follows.

The wholesale server 350 that may be seen as a bidding platform will comprise an API brokerage unit 302, to publish call for bid, via e.g. available operator specific billing schemes and receive in response to the publishing the charging rule requests from one or more third party or application server 180 like the MegaSports server.

A Real-time network capacity detection module, or RNCD module 304, is a software unit or component which consolidates current network usage by analyzing traffic at network modules like MME (Mobility management entity) to know how many communication devices/UE are in idle mode, how many bearer channels are currently active, Information from eNodeB like numbers of users in each cell site, Information from p-gateway like UEs connected to external packet networks (e.g. number of MegaSports sessions, number of Social Network sessions) and HSS (home subscriber server) information like user and access authorization and other information from ePDG and mobile backhaul.

A Statistical network capacity predictor module, or SNCP module 310, is a software unit or component responsible for analyzing the patterns in network usage over a given period of time (e.g. 1 year) including finding peak times of usage, peak days of usage (Game day), peak months, social events, holidays, and other prominent events that happened during past time period. Using the data collected by the RNCD module 304, the SNCP module 310 will create a model to predict demand on a particular day and particular time. Typical questions answered by this module is "What will be the network usage on January 31st 6 PM to 8 PM in a particular cell site", the answer would be—cell site may have 20 MB band width available for a period on 1 hour.

A prepaid data meter 312 is also available and configured to monitor information for the already authorized prepaid data connection. Information which may be collected for the prepaid connection includes a data transmission amount, a data received amount, a data connection duration, a destination of data transmitted, a source of data received, one or more data request messages, one or more data response messages, and a time at which the authorized data connection was established. The prepaid data meter 312 may also time stamp each element of information to identify when the metered value was collected. Such information may be useful to take into account the impact of existing prepaid data connection in offering new operator specific billing schemes to bidders.

A usage analyzer module 316 is available to calculate statistics and available real time capacity from data collected with the RNCD module 304, the SNCP module 310 and the prepaid data meter 312. The real time available capacity (x) may be calculated using (Total planned capacity p)−f(MME(i)+PGW(i)+HSS(i)+ePDG(i));

The total real-time available capacity can be detected by using planned capacity metrics, and function of information available at MME, PGW, HSS and ePDG.

The bidding module 322 will analyze the charging rule requests received from application servers like the MegaSports server 180, and will determine availability of the operator specific billing based on network parameters as reported by the usage analyzer module 316 and the received charging rule request. Once an available operator specific billing updating is determined by the bidding module 316, it will update the database of the Policy and Charging Rules Function (PCRF) entity 360 in the communication network based on the available operator specific billing and an identifier for the application server, for subsequent charging of data exchanged with the application server 180 at said available operator specific billing.

A charging rule request from an application server may be for instance offering toll free data for data connectivity between communication devices using its application to connect to the application server on weekends, or up to 2 Gbytes of data, or 3 hours of connection. Say MegaSports on a quiet weekend with limited sports event, may offer free access to its content server through its IOS or Android MegaSports application so that users may discover the application and the offered content, so that they may be interested in becoming subscribers to the MegaSports content. The MegaSports application server will send a charging rule request to the wholesale server 350, identifying periods of time in a calendar year, that corresponds to this "quiet weekends", requesting toll free access through its application to MegaSports content such as live streaming. Alternatively, the charging rule request may be defined by a maximum amount of data users may consume toll free over larger periods of time. The bidding server 360 will check network parameters such as available, or predicted capacity, QoS . . . to see what operator specific billing schemes may be offered based on the charging rule request. The exact request may be granted or an alternative solution may be offered by the wholesale server 360 based on the network parameters as known through the usage analyzer module 316, and information from the charging rule request, such as what the third party server is offering to the operator for the transaction.

Figure 4:
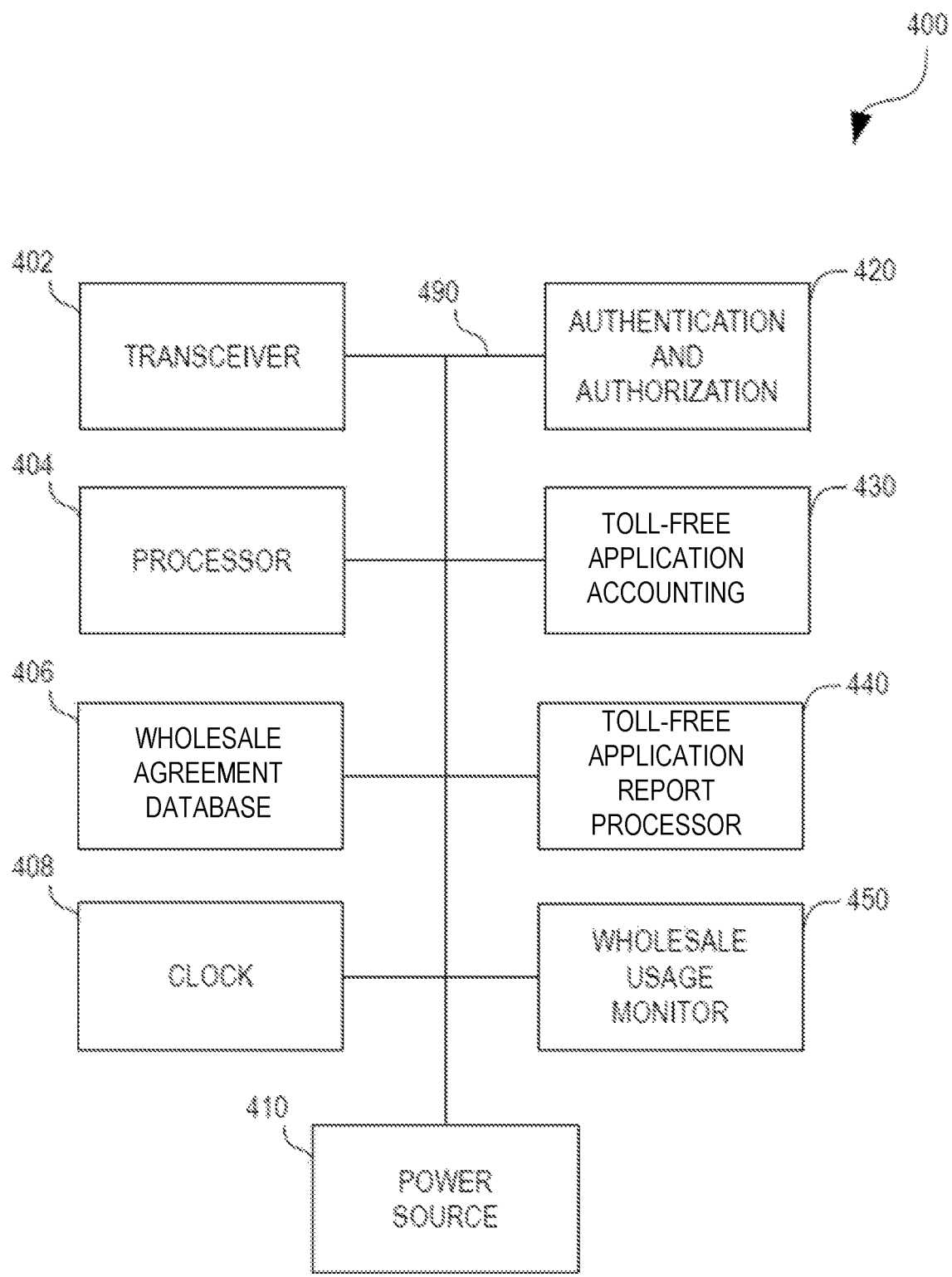
FIG. 4 is a functional block diagram of an example access control server.

FIG. 4 is a functional block diagram of an example access control server. In the present system, the access control server 400 has two main functions. It is first configured to manage the provisioning of a device normal (i.e. regular) data access, i.e. access according to the device connectivity policy, i.e. its subscription or data plan. This access control management includes allowing data access to the communication device according to its subscription plan as long as the conditions defined in the device connectivity policy are matched. This may include for instance a data traffic threshold marking a change in data traffic billing. The management may also include keeping track of the regular data access by maintaining a first quantity indicative of the data traffic resulting from the device data connections.

The access control server 400 is secondly configured to manage the provisioning of a wholesale data access (e.g., toll-free or subsidized access) for prepaid applications, once a PCRF rule has been created with operator specific billing by the wholesale server 360. This wholesale management includes receiving updates for new entries in the PCRF database, receiving data connectivity request from prepaid application, providing the authentication and authorization of the prepaid data policy, and providing an authorization interface and reconciliation interface for the partner operators for the rebilling of the wholesale data access.

The access control server 400 may include one or more antennas (not shown) and a transceiver for the transmission and reception of wireless signals; a processor 404; an wholesale agreement database 406; a bus for interconnecting the server 400 different modules and a power source 410 (e.g., battery, solar panel, wired power connection). In some implementations, the access control server 400 includes a wired network connection (e.g., Ethernet port, fiber optic data port).

The database 406 may comprise the device data connectivity policy for all devices which are subscribers to the network operator managing server 400. The device data connectivity policy for a communication device defining conditions under which the device may exchange data traffic with one or more service providers over a telecommunication network, e.g. its home network. Such data connectivity policy may include one or more thresholds over a predefined period of time, say 4Gb/month or 20 hours/week, limits beyond which data traffic may still be allowed, but under different billing conditions. The database 406 may further comprise the wholesale agreements defining the application data connectivity policies for the prepaid application, corresponding to the new entries in the PCRF database 360. The wholesale agreements define the payment agreements between the home network operators, partner network operators and the application servers 180.

The access control server 400 includes an authentication and authorization circuit 420. The authentication and authorization circuit 420 is configured to receive data access requests from electronic devices. The data access is granted based on the device data connectivity policy using mechanisms known to the man skilled in the art. For instance the authentication and authorization circuit 420 may be configured to parse a device data access request to identify the information upon which the authorization determination may be made. The authentication and authorization circuit 420 may then compare the information included in the data access request with device information included in the database 406. One may note that the data access for a device may be handled by an authentication and authorization circuit hosted by a server different then the access control server 400. It was regrouped here for the sake of simplicity.

The authentication and authorization circuit 420 may also grant wholesale authorization requests from prepaid applications and generate an appropriate response. The authentication and authorization circuit 420 may be configured to parse the authorization request to identify the information upon which the prepaid authorization determination will be made. The authentication and authorization circuit 420 may then compare the information included in the authorization request with information included in the database 406. For example, if the authorization request includes an application identifier or an application server identifier, the authentication and authorization circuit 420 may look up a data policy associated with the application identifier. This information may then be included in the authorization response.

The authentication and authorization circuit 420 maybe further configured to generate an authentication token to indicate the authorization determination for the requests from the prepaid application. The authorization token may be generated only when the request is authorized. In some implementations, the token may be generated for all prepaid application requests (e.g., authorized or unauthorized).

The access control server 400 shown in FIG. 4 includes a toll free application accounting circuit 430. The application accounting circuit 430 is configured to reconcile data usage for the device and the prepaid applications if any on a device. For example, the application accounting circuit 430 may be configured to periodically (e.g., daily, weekly, hourly, monthly) communicate with the billing server 150. The device and application accounting circuit 430 may transmit indicators to account some of the data traffic for the electronic device as part of its data plan subscription. The application accounting circuit 430 may further transmit indicators to exclude the toll-free application data usage from individual subscriber's bills. The application accounting circuit 430 may be further configured to reconcile usage fees associated to the prepaid application incurred via partner operators. In this situation, the application accounting circuit 430 may receive a request for prepaid application data provided via the partner operator and generate a response. The response may include an automatic clearing transaction identifier associated with a funds transfer to the partner operator. The response may include additional status information such as disputed amounts, discrepancy amounts, and the like. The application accounting circuit 430 may further generate billing information for the application server 180. For example, if the application provider has agreed to pay a fixed amount per prepaid application deployed, the application accounting circuit 430 may collect this information, such as from the database 406, and generate an appropriate billing request (e.g., via the billing server) for transmission to the application provider, that provides the prepaid application operating with the application server 180.

The wholesale server 400 shown in FIG. 4 includes a prepaid application report processor 440. The application report processor 440 is configured to generate reports illustrating aspects of the prepaid application. The reports may be summary reports such as total number of users or total quantity of data utilized. The reports may include aggregations such as by date/time, by device type, by user, by device, by location, by network used for data access, by application version number, and the like.

The prepaid application report processor 440 reports may be based on the information collected by an access and wholesale usage monitor 450. The access and wholesale usage monitor 450 is firstly configured to receive the usage information from a prepaid application. The wholesale usage monitor 450 may store the received information in the database 406. In some implementations, the access and wholesale usage monitor 450 may be configured to inspect packet data received from a wrapped application and generate usage information. The packet inspector 160 may be consulted to generate the usage information.

The access and wholesale usage monitor 450 may further be arranged to maintain a first quantity, mentioned before, indicative of the data traffic monitored via the data connections associated to the communication device 200. The first quantity is a measure of the data usage from the device, and may be calculated also using the packet inspector mentioned before. The first quantity may be a measurement of an amount of data traffic, data packets, volume of data traffic . . . . It may also be a measurement of the duration of the data traffic. The first quantity will be measured based on the type of data traffic thresholds defined in the data connectivity policy of the communication device 200.

Figure 2A:
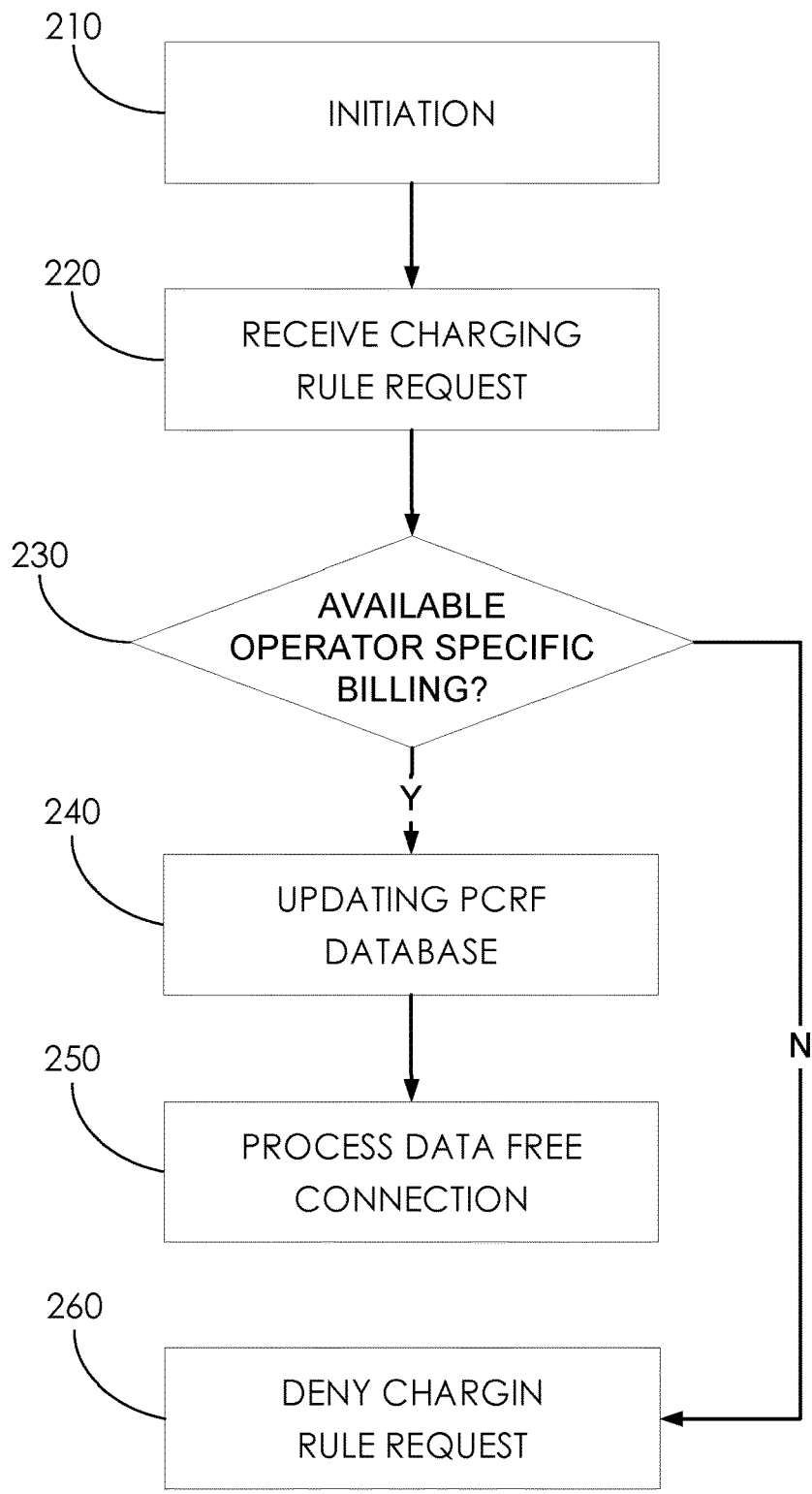
FIG. 2A is a process flow diagram for an example method of obtaining operator specific billing.
Figure 5:
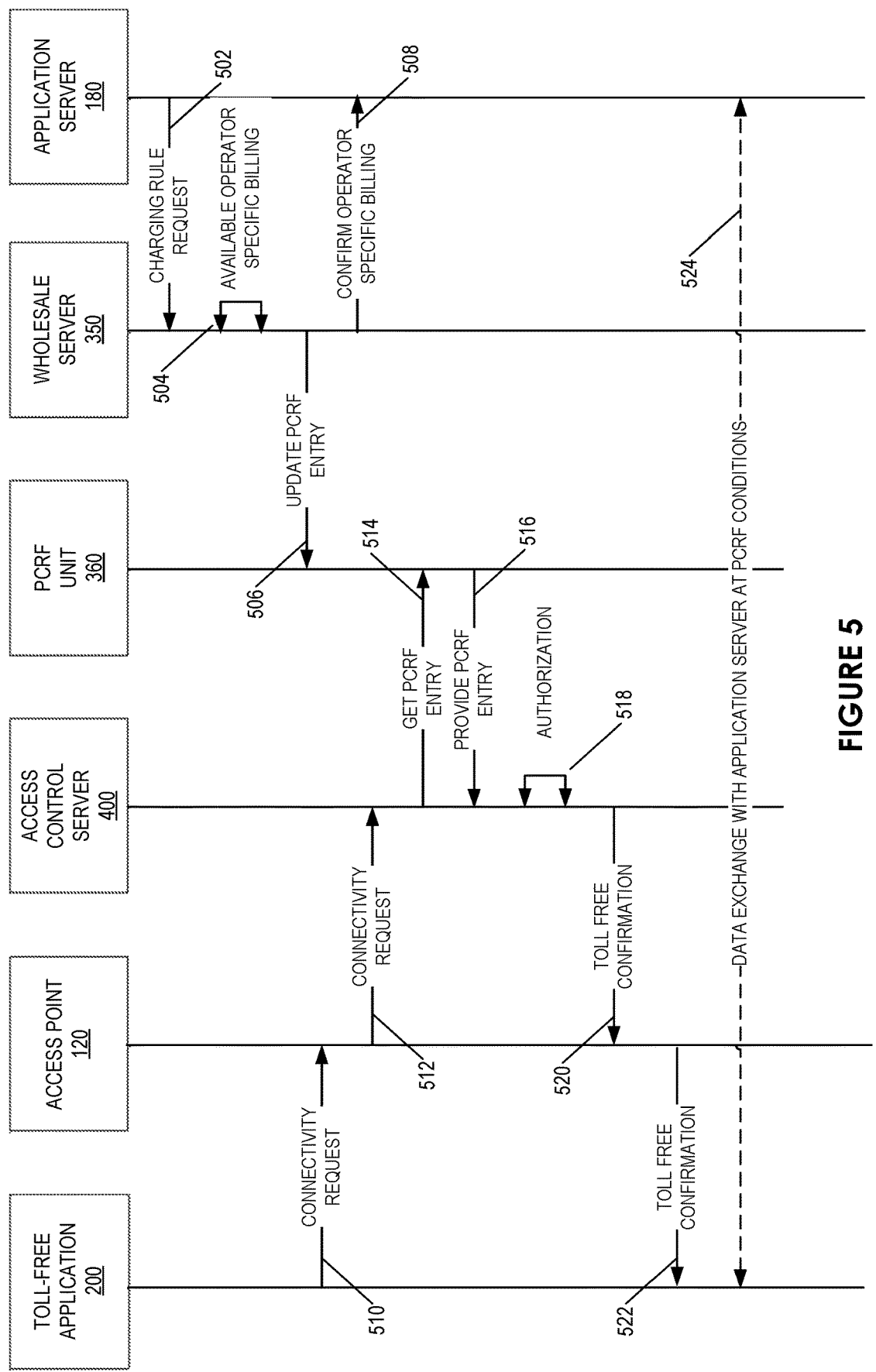
FIG. 5 is a message diagram for obtaining a wholesale data connection.

Examples of obtaining a wholesale data access and further usage of that data access are illustrated respectively in FIGS. 2A and 5, FIG. 2A illustrating an embodiment of the present method, while FIG. 5 illustrates the message flow to enable the present method. They both are implemented in part by the wholesale server 360.

The message flow of FIG. 5 shows messages exchanged between several entities which may be included in a communication system. For ease of explanation, the number of entities shown has been limited. However, it will be understood that additional entities may be added or multiple entities combined consistent with the description herein. The message flow of FIG. 5 illustrates obtaining a wholesale data connection via a network which is controlled by the wholesale operator.

Referring to FIG. 2A, in a preliminary act 210, the wholesale server 360 may publish via APIs, such as a brokerage unit, the information that available operator specific billing schemes. Such publishing may be seen as a call for bids to the application providers and third parties such as MegaSports in the previously mentioned illustration. The information may be data related to the availability of network capacity or information on the operator specific billing available to third parties through the present bidding system. Further details about this preliminary act 210 is provided in FIG. 2B described here after.

In response to the call for bids of act 210, one or more application providers, here again for sake of simplification mixed up with their respective application servers, send via the brokerage unit, requests for charging rules in a further act 220. This corresponds to the message 502 in FIG. 5. As explained before, the charging rule request may comprise charging rules or conditions for the application provided by the application provider/server, like an amount of data connection time or data traffic exchanged by the prepaid application that will be charged to the application provider instead of being accrued to the user data plan. The charging rule request may further comprise pricing elements that the application provider is willing to offer the operator of the wholesale server 360 in exchanged of the operator specific billing applied by the operator to all data exchanged by users with the prepaid application.

In a further act 220, the wholesale server 360 will determine availability of the operator specific billing schemes based on network parameters and the charging rule request. The determination may rely upon the information available to the bidding module 322 described in relation to FIG. 3. Depending on the current and/or expected resources of the network, the bidding module will determine possible operator specific billing it may offer to the application provider in a further act 230. This corresponds to message flow 504 from the wholesale server with itself in FIG. 5.

Provided the charging rule request cannot be addressed by the wholesale server (answer No to act 230), the request will be denied or declined in a further act 260 and a message 506 will be sent to inform the application server consequently. The request may simply be denied if the current or expected network resources do not allow the extra data traffic that the prepaid application may generate, or simply because the pricing conditions offered by the application provider are not sufficient to make the deal profitable to the network operator.

Provided an operator specific billing scheme may be provided to the application provider (answer Yes to act 230), it will in a further act 240 update the database the a Policy and Charging Rules Function (PCRF) entity 360 in the communication network based on the available operator specific billing and an identifier for the application server. In other words, it will instruct through message 506 in FIG. 5 the PCRF entity to update or create an entry referenced with an identifier for the application server and associated with the determined operator specific billing conditions. To update the entry for the application server (identifier), the bidding server 350 will set the policy and charging rule respectively for the data connection related to the toll-free application. The policy may define the condition under which the data is prepaid, e.g. the window period when the data connection with the application server 180 is free of charge. The charging rule itself may define how the billing server may reverse the charging to the application provider or how the data is not, totally or in part, billed on the user's regular data plan.

A confirmation of the agreement and update to the PCRF database may be sent to the application server/provider with a further message 508 as seen in FIG. 5.

In a further act 250, the subsequent data exchanged by communication devices with the application server, when running the application, will be charged according to the new entry in the PCRF database. This corresponds to message flows 510 to 522.

When a prepaid application triggered on a communication device of a user sends a data connectivity request (message 510 in FIG. 5 to the access point 120), the request message will transit from the access point 120 to the access control server 400. The data connectivity request may comprise an indication that the operator or application specific billing will apply to the resulting data connection with a distant application server 180. Based on such an indication and/or the application server identified in the data connectivity request, the access control server 400 will retrieve in the PCRF unit 360 the operator specific billing associated to an identifier for the application server (messages 514 and 516 to and from the PCRF entity 360). The authorization will be granted through message 518 by the access control server 400 based on the retrieved operator specific billing. A toll free confirmation to the request will be sent to the communication device and its toll free application with subsequent messages 520 and 522. Once the connection established with the application server 180 (not shown in FIG. 5), the data exchanged over the connection will be charged at the operator specific billing conditions (messages 524 in dotted lines between the toll free application 200 and the application server 180). In other words, such data packets exchanged to and from the communication devices will be tagged with the application server identifier, so that the access control server may apply the corresponding operator specific billing retrieved from the PCRF entity.

Figure 2B:
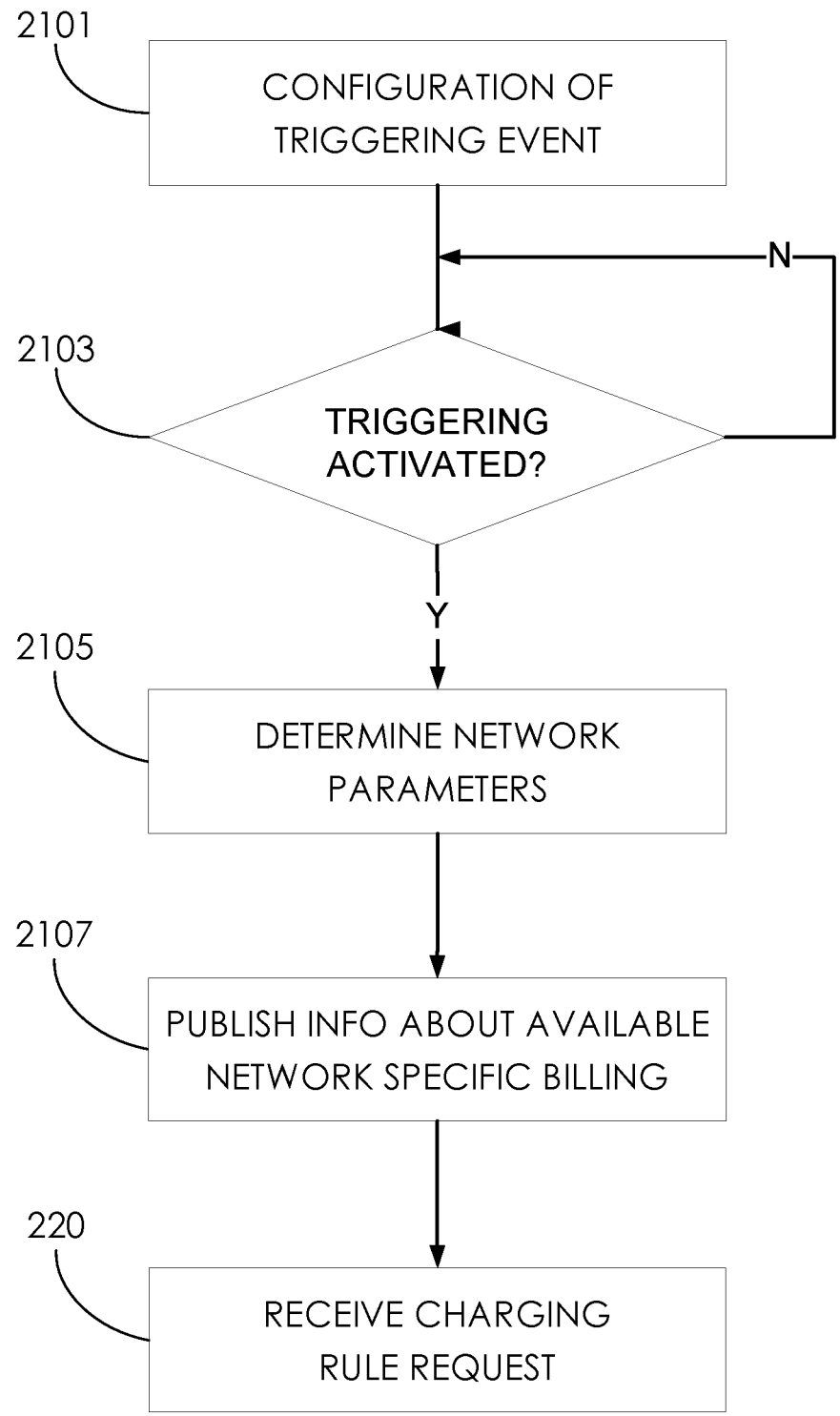
FIG. 2B is a process flow diagram for an example of initiating the method of obtaining operator specific billing.

FIG. 2B shows a detailed flow diagram of the initiation act 210 of FIG. 2A. The flow diagram is illustrated as being carried out by the bidding server 350. The monitoring of the triggering may be managed by another network entity operatively coupled with the bidding server 350.

In a first act 2101, the network operator controlling the bidding server 350 may configure a triggering event, a trigger in short, for publishing the calls for bids to the application providers and third parties. The trigger may be based for instance on real time capacity of the network, based on its current charge compared to the maximum charge it is dimensioned for. The triggering may also add a localization element as the charge may vary between regions of the communication network. Example of a trigger may be to set for zip code 94114 in California a trigger when 40% or more of network capacity is available. The trigger may be seen as a test on one or more network parameters allowing the present method to be implemented. When the network is not in high demand, it may be interesting to allow other data exchange than the regular subscription plans of network users.

In a further act 2103, the server will monitor if the triggering event has been actuated or has occurred. Provided the trigger is not activated (answer No to act 2103), the server will carry on monitoring the conditions that may set of the trigger. When the trigger is defined as a percentage of the network capacity, it will keep on monitoring the network for available resources above 40% for the 94114 location as in the present example.

Provided it is activated (answer Yes to act 2103), the server will measure further network parameters in an additional act 2015. It will rely upon the SNCP module 310 and RNCD module 304 described before. The triggering may be seen as detecting based on one or more network parameters that the operator may offer additional data plans then the regular subscriber plans, i.e. that operator specific billing schemes are available. Indeed the information collected from the RNCD and SNCP modules gives an indication that the bidding server can address charging rule requests received from third party application providers and/or servers.

In a further act 2107, based on the triggering of act 2103 and the collected data from act 2105, the bidding server will publish information about the available operator specific billing. The present method will continue with act 220 of FIG. 2B.

The present system was illustrated using wrapped applications to turn a regular application into a prepaid or toll-free application. A regular application may become prepaid through the use of a configuration file defining the application data connectivity policy, and a toll-free agent hosted on the communication device. Similarly to the wrapped implementation, an agent on the communication device may be able to implement the application data connectivity policy as the application makes data connection requests to the network, and tag the resulting data connectivity requests as related to operator specific billing conditions.

Reference was made also to an application server to provide content through an application executed locally on a communication device. The application may be provided by an application provider distinct from but operating the application server. As the application provider may control the application server so that it can operate with the application, they both are operatively coupled and may be seen as a same entity.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for providing data connectivity in a packet mode communication network, the method comprising the following acts performed by an intermediary platform hosted by a server connected to the packet mode communication network:
   receiving, via an application programming interface operating at a first brokerage control unit, a charging rule request that defines charging rules to allow one or more communication devices in the communication network to exchange with an application server data charged under an operator specific billing scheme for an application which operates with the application server;
   determining availability of the operator specific billing scheme based on network parameters from the packet mode communication network and the charging rule request,
   updating a database of a Policy and Charging Rules Function (PCRF) entity in the communication network based on the available operator specific billing scheme and an identifier for the application server, for subsequent charging of data exchanged with the application server at said available operator specific billing scheme.

2. The method according to the previous claim 1, further comprising, for an application server identifier present in the PCRF database:
   identifying packets to or from communication devices tagged with the application server identifier,
   applying to the identified packets the operator specific billing scheme from the PCRF entity database associated to the application server identifier.

3. The method according to the previous claim 1, further comprising a preliminary act of:
   publishing, via the first brokerage unit, information about the available operator specific billing scheme,
   the act of receiving a charging rule request being received in response to the publishing.

4. The method according to the previous claim 3, where in the publishing further comprise:

detecting based on one or more network parameters that operator specific billing schemes are available, the publishing of information being triggered based on the detecting.

5. The method according to the previous claim 3, further comprising:
sending a confirmation of the available operator specific billing scheme to the application server in response to the charging rule request.

6. The method according to the previous claim 1, wherein the parameters from the communication network are one or more of a network available capacity, network forecasted capacity and/or Quality of Service.

7. A server for providing data connectivity in a packet mode communication network, the comprising a processor arranged to:
receive, via an application programming interface operating at a first brokerage control unit, a charging rule request that defines charging rules to allow one or more communication devices in the communication network to exchange with an application server data charged under an operator specific billing scheme for an application which operates with the application server;
determine availability of the operator specific billing scheme based on network parameters from the packet mode communication network and the charging rule request,
update a database of a Policy and Charging Rules Function (PCRF) entity in the communication network based on the available operator specific billing scheme and an identifier for the application server, for subsequent charging of data exchanged with the application server at said available operator specific billing scheme.

8. The server according to the previous claim 7, further arranged to, for an application server identifier present in the PCRF database:
identify packets to or from communication devices tagged with the application server identifier,
apply to the identified packets the operator specific billing scheme from the PCRF entity database associated to the application server identifier.

9. The server according to the previous claim 7, further arranged to publish, via the first brokerage unit, information about the available operator specific billing scheme.

10. The server according to the previous claim 9, further arranged to detect based on one or more network parameters that operator specific billing schemes are available, the publishing of information being triggered based on the detecting.

11. The server according to the previous claim 9, further arranged to send a confirmation of the available operator specific billing scheme to the application server in response to the charging rule request.

12. The server according to the previous claim 7, wherein the parameters from the communication network are one or more of a network available capacity, network forecasted capacity and/or Quality of Service.

13. A non-transitory computer-readable storage medium comprising a program product stored thereon and executable by a processor in the form of a software agent including at least one software module set up to implement a method of providing data connectivity in a packet mode communication network, the method comprising:
receiving, via an application programming interface operating at a first brokerage control unit, a charging rule request that defines charging rules to allow one or more communication devices in the communication network to exchange with an application server data charged under an operator specific billing scheme for an application which operates with the application server;
determining availability of the operator specific billing scheme based on network parameters from the packet mode communication network and the charging rule request,
updating a database of a Policy and Charging Rules Function (PCRF) entity in the communication network based on the available operator specific billing scheme and an identifier for the application server, for subsequent charging of data exchanged with the application server at said available operator specific billing scheme.

14. A telecommunication system comprising:
an application server for exchanging over a communication network data packets with communication devices,
a Policy and Charging Rules Function (PCRF) entity comprising a PCRF database for storing operator specific billing schemes associated to the application server,
an access server comprising a processor arranged to:
receive, via an application programming interface operating at a first brokerage control unit, a charging rule request that defines charging rules to allow one or more communication devices in the communication network to exchange with an application server data charged under an operator specific billing scheme for an application which operates with the application server;
determine availability of the operator specific billing scheme based on network parameters from the packet mode communication network and the charging rule request,
update the PCRF database based on the available operator specific billing scheme and an identifier for the application server, for subsequent charging of data exchanged with the application server at said available operator specific billing scheme.

* * * * *